United States Patent Office 3,652,562
Patented Mar. 28, 1972

---

3,652,562
PYRIDAZONE DERIVATIVES
Franz Reicheneder and Rudolf Kropp, Ludwigshafen, and Adolf Fischer, Mutterstadt, Germany, assignors to Badische Anilin- & Soda-Fabrik Aktiengesellschaft, Ludwigshafen (Rhine), Germany
No Drawing. Filed Mar. 9, 1970, Ser. No. 17,923
Claims priority, application Germany, Mar. 13, 1969, P 19 12 770.9
Int. Cl. C07d 51/04
U.S. Cl. 260—250 A          6 Claims

ABSTRACT OF THE DISCLOSURE

New and valuable pyridazone derivatives having the formula

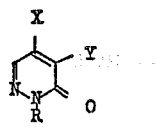

where R denotes a phenyl or aralkyl radical which may be substituted by halogen, alkyl, alkoxy or haloalkyl, a cyclohexyl radical which may be substituted by halogen or alkyl, Y denotes hydrogen, halogen, alkoxy or mercaptoalkyl, X denotes the groups

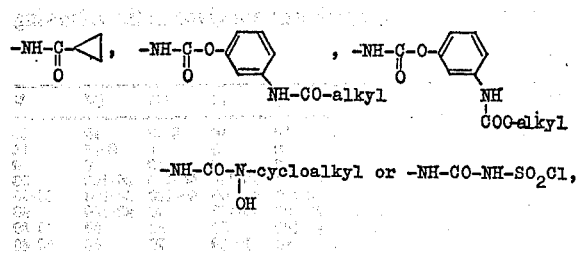

and, when Y denotes hydrogen or R denotes aralkyl, X may additionally denote the amino or acetylamino group, and a process for controlling the growth of unwanted plants with these compounds.

---

The present invention relates to new and valuable pyridazone derivatives having a good herbicidal action and to herbicides containing these compounds.

It is known to use 1-phenyl-4-amino-5-chloropyridazone-6 for controlling unwanted plants; however, its action is unsatisfactory.

We have now found that pyridazone derivatives having the formula

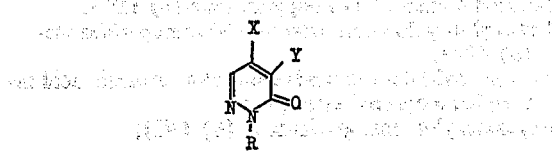

where R denotes a phenyl or aralkyl radical (benzyl) which may be substituted by halogen (fluorine chlorine, bromine), alkyl (methyl), alkoxy (methoxy, ethoxy) or haloalkyl (trifluoromethyl), a cyclohexyl radical which may be substituted by halogen (chlorine, bromine) or alkyl (methyl), Y denotes hydrogen, halogen (chlorine, bromine, iodine, fluorine), alkoxy (methoxy) or mercaptoalkyl (thiomethyl), X denotes the groups

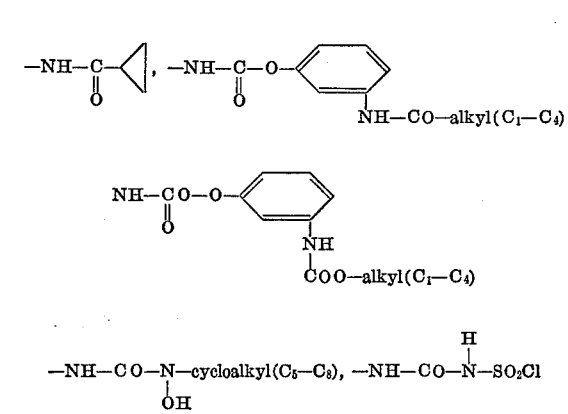

and, when Y denotes hydrogen or R denotes aralkyl, X may additionally denote the amino or acetylamino group, have a good herbicidal action. This good action is particularly in evidence on unwanted grasses.

The new pyridazones may be produced in simple manner by reacting 4 - isocyanatopyridazones with m-acylaminophenols or with hydroxylamines, or 4 - aminopyridazones with chlorosulfonyl isocyanate or with cyclopropanecarboxylic chloride, or 4,5 - dihalopyridazones with ammonia, or 4-amino-5-chloropyridazones with hydrogen.

The pyridazones may also be produced by reaction of a 4-isocyanatopyridazone, e.g. 1-phenyl-4-isocyanate-5-chloropyridazone-6, with a m - acylaminophenol, e.g. m-acetylaminophenol. By reacting these two specific compounds, the pyridazone derivative in the list below having a melting point of 145° to 149° C. is obtained.

The active ingredients may further be produced by reaction of a 4-isocyanatopyridazone, e.g. 1-phenyl-4-isocyanato-5-chloropyridazone-6, with a m-carbamoyloxyphenol, e.g. m-carbethoxyaminophenol. By reacting these two specific compounds, the pyridazone derivatives in the list below having a melting point of 138° to 142° C. is obtained.

The preparation of 1 - cyclohexyl-4-aminopyridazone-(6) is described below:

100 parts of 1-cyclohexyl-4-amino-5-chloropyridazone-(6) (German printed application No. 1,105,232) is suspended in 1000 parts of methanol; 100 parts of aqueous 25% ammonia solution is then added. While adding 200 parts of Raney nickel, the mixture is treated with hydrogen in a stirred autoclave at 130° C. and at a pressure of 200 atmospheres gauge. After six hours the pressure is released, the nickel filtered off and the filtrate is evaporated. 80 parts (=94.4% of the theory) of 1-cyclohexyl-4-aminopyridazone-(6) having a melting point of 195° to 197° C. (recrystallized from acetonitrile) is obtained.

The following active ingredients are examples of the compounds according to the invention:

| R | X | Y | M.P. |
|---|---|---|------|
| phenyl | —NH.CO.N(OH)—phenyl | —Br | 152 to 153° C. |
| phenyl | —NH.CO.O—phenyl(NH.COCH₃) | —Br | 186 to 188° C. |
| phenyl | —NH.CO.O—phenyl(NH.COOC₂H₅) | —Cl | 138 to 142° C. |
| phenyl | —NH.CO—cyclopropyl | —Br | 159 to 161° C. |
| phenyl | —NH.CO.NH.SO₂Cl | —Cl | From 110° C., (decomposes). |
| —CH₂—phenyl | —NH₂ | —Br | 217 to 219° C. |
| cyclohexyl | —NH₂ | —H | 195 to 197° C. |
| phenyl | —NH—CO—O—phenyl(NH—COOCH₃) | Br | 131 to 136° C. |
| phenyl | —NH—CO—O—phenyl(NH—COCH₃) | Cl | 145 to 149° C. |

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C. e.g. tetrahydronaphthalene or alkylated naphthalenes, or organic liquids having boiling points higher than 150° C. and one or more than one functional group, e.g. the keto group, ether group, ester group or amide group, this group being attached as substituent to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. diatomaceous earth, talc, clay or fertilizers.

EXAMPLE 1

Loamy sandy soil is filled into pots and sown with the seeds of wheat (Triticum vulgare), Indian corn (Zea mays), beet (Beta vulgaris), wild mustard (Sinapis arvensis), chickweed (Stellaria media), small nettle (Urtica urens), annual meadow grass (Poa annua), slender foxtail (Alopecurus myosuroides) and barnyard grass (Echinochloa crus-galli). The soil prepared in this manner is subsequently treated with 2 kg. per hectare of N-(1-phenyl-5-bromo-pyridazon-6-yl-4-N'-hydroxy) - N' - cyclohexylurea (I), with 2 kg. per hectare of 1-phenyl-4-(β-carboxymethoxypropionyl)-amino-5-bromo-pyridazone (6) (II), with 2 kg. per hectare of 1-benzyl-4-amino-5-bromopyridazone-(6) (III), with 2 kg. per hectare of 1-phenyl-4-cyclopropionylamino-5-bromopyridazone-(6) (IV) and, for comparison, with 2 kg. per hectare of 1-phenyl-4-amino-5-chloropyridazone-(6) (V), these amounts of the active ingredients each being dispersed in 500 liters of water per hectare.

After 4 to 5 weeks it is ascertained that active ingredients I, II, III and IV have a stronger herbicidal action than active ingredient V.

The results of the experiment are given in the following table:

| Active ingredient | I | II | III | IV | V |
|---|---|---|---|---|---|
| Wheat | 10 | 10 | 0–10 | 10 | 20 |
| Indian corn | 0 | 0 | 0 | 0–10 | 10 |
| Beet | 0 | 0 | 0–10 | 0 | 0 |
| Wild mustard | 90–100 | 90–100 | 90–100 | 90–100 | 90 |
| Chickweed | 90–100 | 90–100 | 90–100 | 90–100 | 80–90 |
| Small nettle | 90–100 | 90–100 | 90 | 90–100 | 90 |
| Annual meadow grass | 90–100 | 80 | 80 | 90 | 70–80 |
| Slender foxtail | 80 | 70–80 | 70 | 80 | 50–60 |
| Barnyard grass | 80 | 70–80 | 70 | 80 | 30–40 |

0=No damage; 100=Total destruction.

EXAMPLE 2

The plants wheat (Triticum vulgare), Indian corn (Zea mays), beet (Beta vulgaris), wild mustard (Sinapis arvensis), chickweed (Stellaria media), small nettle (Urtica urens), annual meadow grass (Poa annua), slender foxtail (Alopecurus myosuroides) and barnyard grass (Echinochloa crus-galli) are treated at a growth height of 3 to 15 cm. with 2 kg. per hectare of each of the following active ingredients:

N-(1-phenyl-5-bromopyridazon-6-yl-4-N'-hydroxy-N'-cyclohexylurea (I);

1-phenyl-4-(β-carboxymethoxypropionyl)-amino-5-bromopyridazone-(6) (II);

1-benzyl-4-amino-5-bromopyridazone-(6) (III);

1-phenyl-4-cyclopropionylamino-5-bromopyridazone-(6) (IV);

N-(1-phenyl-5-bromopyridazon-6-yl-4-carbamic acid-m-acetylaminophenyl ester (V);

1-cyclohexyl-4-aminopyridazone-(6) (VI);

N-4-(1-phenyl-5-chloropyridazon-6-yl)-N'-chlorosulfonylurea (VII);

for comparison, 1-phenyl-4-amino-5-chloropyridazone-6 (VIII), these amounts of the active ingredients each being dispersed in 500 liters of water per hectare.

After 3 to 4 weeks it is ascertained that compounds I, II, III, IV, V, VI and VII have a stronger herbicidal action than compound VIII.

The results of the experiment are given in the following table.

|  | Active ingredient | | | | | | | |
|---|---|---|---|---|---|---|---|---|
|  | I | II | III | IV | V | VI | VII | VIII |
| Wheat | 10 | 20 | 10 | 10-20 | 10-20 | 10 | 10-20 | 20 |
| Indian corn | 0 | 0-10 | 0-10 | 0 | 10 | 0-10 | 10 | 10 |
| Beet | 10 | 0 | 10 | 0 | 0 | 10-20 | 10-20 | 0 |
| Wild mustard | 90 | 90 | 90-100 | 90 | 90-100 | 90 | 90 | 80 |
| Chickweed | 90 | 90 | 90-100 | 90 | 90-100 | 90 | 80 | 70-80 |
| Small nettle | 90 | 90 | 90-100 | 90-100 | 90-100 | 90 | 90 | 80-90 |
| Annual meadow grass | 80 | 70 | 80-90 | 70-80 | 90-100 | 70-80 | 70-80 | 60-70 |
| Slender foxtail | 80 | 70 | 80 | 70 | 70-80 | 70 | 70 | 60 |
| Barnyard grass | 70-80 | 70 | 100 | 70 | 80 | 70-80 | 60-70 | 40 |

0=No damage; 100=Total destruction.

The action of the following active ingredients corresponds to that of the active ingredients, with the exception of 1-phenyl-4-amino-5-chloropyridazone-6, in Example 1 and 2:

N-(1-phenyl-5-chloropyridazon-6)-yl-4-carbamic acid-m-acetylaminophenyl ester;

N-(1-phenyl-5-bromopyridazon-6)-yl-4-carbamic acid-(m-carbomethoxyaminophenyl)-ester.

N-(1-phenyl-5-chloropyridazon-6)-yl-4-carbamic acid-(m-carbomethoxyaminophenyl)-ester.

EXAMPLE 3

The plants wheat (*Triticum vulgare*), Indian corn (*Zea mays*), beet (*Beta vulgaris*), wild mustard (*Sinapis arvensis*), chickweed (*Stellaria media*), small nettle (*Urtica urens*), annual meadow grass (*Poa annua*), slender foxtail (*Alopecurus myosuroides*) and barnyard grass (*Echinochloa crus-galli*) are treated at a growth height of 3 to 14 cm. with 2 kg. per hectare of N-(1-phenyl-5-chloropyridazon-6)-yl - 4 - carbamic acid-m-acetylaminophenyl ester (A), with 2 kg. per hectare of N-(1-phenyl-5-bromopyridazon-6)-yl-4-carbamic acid-(m-carbomethoxyaminophenyl)-ester (B), and with 2 kg. per hectare of N-(1-phenyl-5-chloropyridazon-6) - yl - 4 - carbamic acid-(m-carbethoxyaminophenyl)-ester (C), these amounts of the active ingredients each being dispersed in 500 liters of water per hectare.

After 3 to 4 weeks the following results are obtained:

| Active ingredient | A | B | C |
|---|---|---|---|
| Triticum vulgare | 5 | 5 | 10 |
| Zea mays | 0 | 0 | 5 |
| Beta vulgaris | 0 | 0 | 0 |
| Sinapis arvensis | 85 | 90 | 85 |
| Stellaria media | 90 | 95 | 90 |
| Urtica urens | 85 | 90 | 85 |
| Poa annua | 75 | 80 | 75 |
| Alopecurus myosuroides | 65 | 65 | 60 |
| Echinochloa crus-galli | 55 | 60 | 55 |

0=No damage; 100=Complete destruction.

EXAMPLE 4

50 parts by weight of compound I from Example 1 is mixed with 50 parts by weight of N-methyl-α-pyrrolidone. A mixture is obtained which is suitable for application in the form of very fine drops.

EXAMPLE 5

20 parts by weight of compound II from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound III from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound A from Example 3 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of compound B from Example 3 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of compound C from Example 3 is intimately mixed with 97 parts by weight of particulate kaolin. A dust is obtained containing 3% by weight of the active ingredient.

EXAMPLE 10

30 parts by weight of compound I from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. N - (1 - phenyl - 5 - bromopyridazon - 6 - yl - 4 - N'-hydroxy)-N'-cyclohexylurea.

2. 1 - phenyl - 4 - cyclopropionylamino-5-bromopyridazone-(6).

3. N - (1 - phenyl - 5 - chloropyridazon - (6) - yl - 4-carbamic acid-(m-acetylaminophenyl)-ester.

4. N - (1 - phenyl - 5 - bromopyridazon - (6) - yl - 4-carbamic acid-(m-carbomethoxyaminophenyl)-ester.

5. N - (1 - phenyl - 5 - chloropyridazon - (6) - yl - 4-carbamic acid-(m-carbethoxyaminophenyl)-ester.

6. A pyridazone derivative having the formula

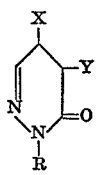

where R denotes phenyl or benzyl which may be substituted by fluorine, chlorine, bromine, methyl, methoxy, ethoxy, trifluoromethyl, or cyclohexyl which may be substituted by chlorine, bromine or methyl, Y denotes hydrogen, halogen, methoxy or thiomethyl, X denotes the groups
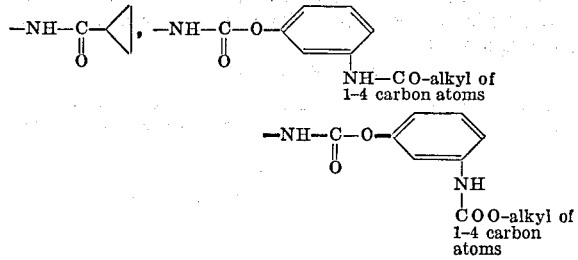
—NH—CO—N—cycloalkyl of 5-8 carbon atoms or
          |
          O
—NH—CO—NH—SO₂Cl
References Cited
UNITED STATES PATENTS
3,341,317   9/1967   Reicheneder et al. __ 260—250 A
NICHOLAS S. RIZZO, Primary Examiner
U.S. Cl. X.R.
71—92

PO-1050
(5/69)

UNITED STATES PATENT OFFICE
CERTIFICATE OF CORRECTION

Patent No. 3,652,562            Dated March 28, 1972

Inventor(s) Franz Reicheneder, Rudolf Kropp, and Adolf Fischer

It is certified that error appears in the above-identified patent and that said Letters Patent are hereby corrected as shown below:

Column 2, line 2, "fluorine chlorine" should read -- fluorine, chlorine --.

Column 4, line 73, "N-(1-phenyl-5-bromopyridazon-6-yl" should read -- N-(1-phenyl-5-bromopyridazon-6)-yl --.

Column 5, line 32, "(m-carbomethoxyaminophenyl)-ester" should read -- (m-carbethoxyaminophenyl)-ester --.

Column 6, line 60, claim 3, "acid-(m-acetylaminophenyl)-ester" should read -- acid-m-acetylaminophenyl)-ester --.

Signed and sealed this 26th day of December 1972.

(SEAL)
Attest:

EDWARD M.FLETCHER,JR.            ROBERT GOTTSCHALK
Attesting Officer                  Commissioner of Patents